(12) United States Patent
Cross

(10) Patent No.: US 6,574,878 B2
(45) Date of Patent: Jun. 10, 2003

(54) METHOD AND APPARATUS FOR ALIGNING SHAFTS

(76) Inventor: Jeffrey E. Cross, 7703 S. 145th West Ave., Sapulpa, OK (US) 74066

( * ) Notice: Subject to any disclaimer, the term of this patent is extended or adjusted under 35 U.S.C. 154(b) by 54 days.

(21) Appl. No.: 09/816,438

(22) Filed: Mar. 26, 2001

(65) Prior Publication Data

US 2002/0133960 A1 Sep. 26, 2002

(51) Int. Cl.[7] .................................................. G01B 5/24
(52) U.S. Cl. ........................................... 33/412; 33/529
(58) Field of Search ......................... 33/412, 16, 529, 33/533, 613, 645, 501.45, 542, 296, 809

(56) References Cited

U.S. PATENT DOCUMENTS

| | | | | |
|---|---|---|---|---|
| 2,216,766 A | * | 10/1940 | Cook | 33/529 |
| 2,314,582 A | * | 3/1943 | Gerich | 33/645 |
| 2,714,255 A | * | 8/1955 | Glazer | 33/645 |
| 3,140,534 A | * | 7/1964 | Messina | 33/529 |
| 3,270,426 A | * | 9/1966 | Fisher et al. | 33/529 |
| 4,103,428 A | * | 8/1978 | Guzick | 33/645 |
| 4,120,095 A | * | 10/1978 | Lebourg | 33/529 |
| 5,813,131 A | * | 9/1998 | Werre | 33/533 |

* cited by examiner

Primary Examiner—Christopher W. Fulton
(74) Attorney, Agent, or Firm—Fellers, Snider, Blankenship, Bailey & Tippens, P.C.

(57) ABSTRACT

A method and apparatus is provided for mechanically coaxially aligning adjacent element shafts in the "X", "Y", and "Z" axis. The apparatus includes a holder and at least one aligning shaft slidably positioned with the holder. The aligning shaft and holder are constructed to receive a respective element shaft in substantially coaxial alignment therewith and to one another.

15 Claims, 3 Drawing Sheets

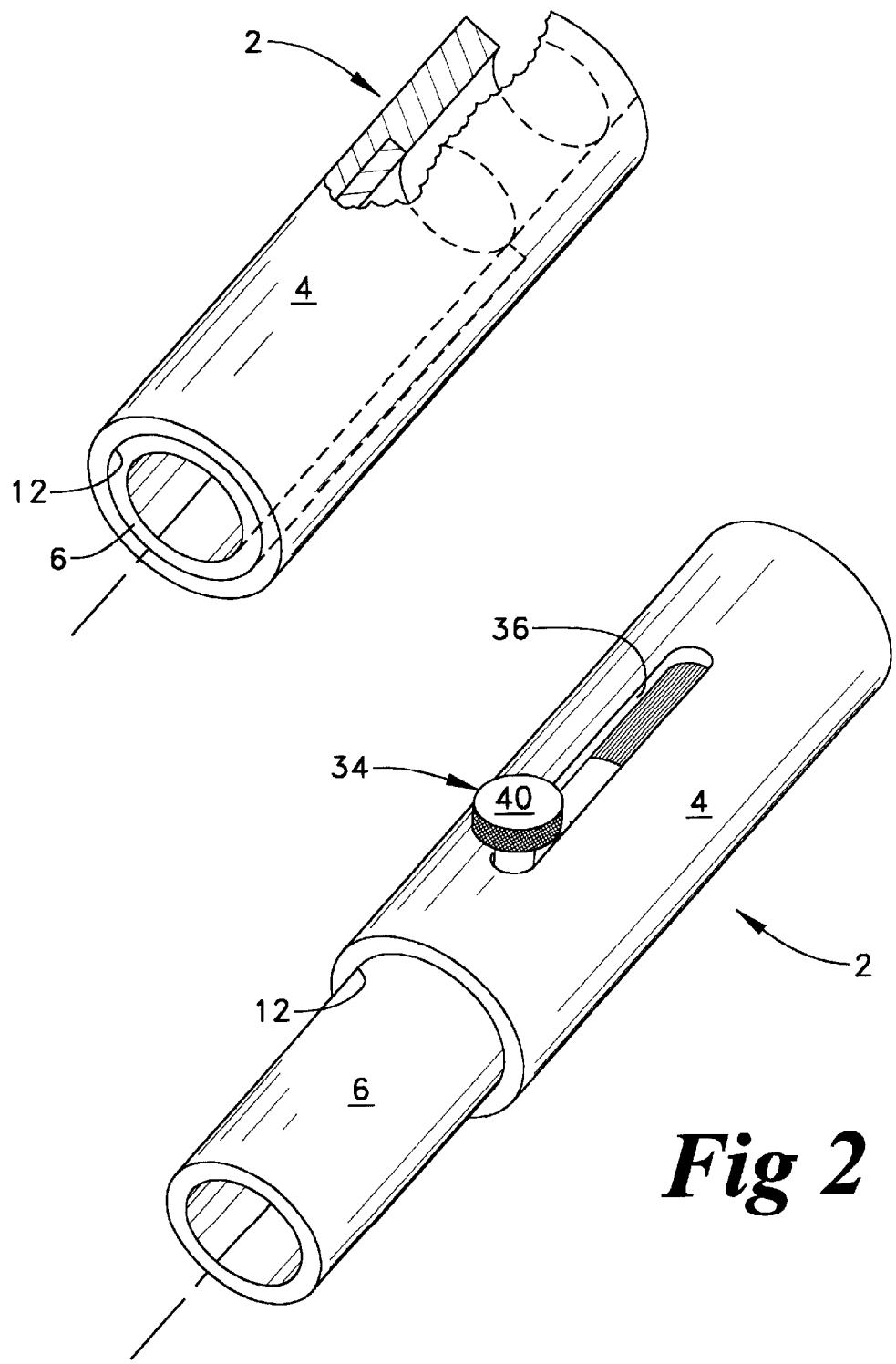

METHOD AND APPARATUS FOR ALIGNING SHAFTS

TECHNICAL FIELD

The subject invention relates to methods and apparatus for aligning shafts. More particularly, the subject invention relates to method an apparatus for substantially coaxially aligning rotatable shafts of adjacently positioned elements.

BACKGROUND ART

There are many problems associated with aligning adjacent shafts, particularly rotatable shafts of, for example, a pump and a motor. Lasers and other devices have been employed, but they are expensive, complicated, and difficult to operate. These difficulties represent a waste of materials, labor and time.

Such heretofore used aligning apparatus often require the use of mathematics, look-up tables and precise positioning and operation of the aligning apparatus. These previously used aligning apparatus also experienced difficulties in aligning the adjacent shafts in the "Z" axis.

The present invention is directed to overcome one or more of the heretofore problems, as set forth above.

DISCLOSURE OF THE INVENTION

In one aspect of the invention, a holder is provided which has an axis and an opening extending therethrough. The opening has first and second portions. The opening first portion is larger and substantially the same diameter as one of the element shafts; and An aligning shaft has an axis, an opening extending therethrough, and a preselected outside diameter. The aligning shaft is slidably, coaxially positionable within the second portion of the holder. The aligning shaft outside diameter is smaller and substantially the same diameter as the diameter of the second end portion of the holder opening. The aligning shaft opening has a diameter larger and substantially the same diameter as the diameter of the other of the element shafts.

In another aspect of the invention an apparatus is provided for substantially coaxially aligning adjacent first and second shafts. A holder is provided which has an axis and an opening. The opening has a preselected diameter extending therethrough.

A first aligning shaft has an axis, a preselected outside diameter, a coaxial opening and is slidably positionable within the holder opening. The first aligning shaft outside diameter is smaller and substantially the same dimensions as the preselected diameter of the holder opening. The first aligning shaft opening is of a size sufficient for receiving a portion of the first rotatable shaft.

A second aligning shaft has an axis, a preselected outside diameter, a coaxial opening and is slidably positionable within the holder opening. The second aligning shaft outside diameter is smaller and substantially the same dimensions as the preselected diameter of the holder opening. The second aligning shaft opening is of a size sufficient for receiving a portion of the second rotatable shaft.

In a further embodiment of the present invention, a method is provided for axially aligning first and second shafts of elements prior to maintaining said elements relative one to the other. In this embodiment, an aligning shaft is inserted within a holder. The holder is then positioned between first and second element shafts of respective first and second elements to be aligned. The holder is thereafter slid onto the first element shaft. The second element shaft is then aligned with the axis of the holder. The aligning shaft is thereafter slid onto the second element shaft.

In yet another aspect of the invention, a method is provided for axially aligning first and second shafts of elements prior to maintaining said elements relative one to the other. In this method, the first and second aligning shafts are inserted within a holder. The first and second aligning shafts and holder are then positioned between first and second shafts of respective first and second elements to be aligned. Thereafter the first aligning shaft is slid onto the first element shaft and releaseably connected to the holder. Thereafter, the second element shaft is aligned with the second aligning shaft opening and then the second aligning shaft is slid into the second element shaft.

BRIEF DESCRIPTION OF THE DRAWINGS

FIG. 1 is a diagrammatic perspective view of the apparatus of this invention with the single aligning shaft positioned within the holder;

FIG. 2 is a diagrammatic perspective view of the apparatus of this invention with the single aligning shaft extended outwardly from the holder;

BEST MODE FOR CARRYING OUT THE INVENTION

Figure 3:
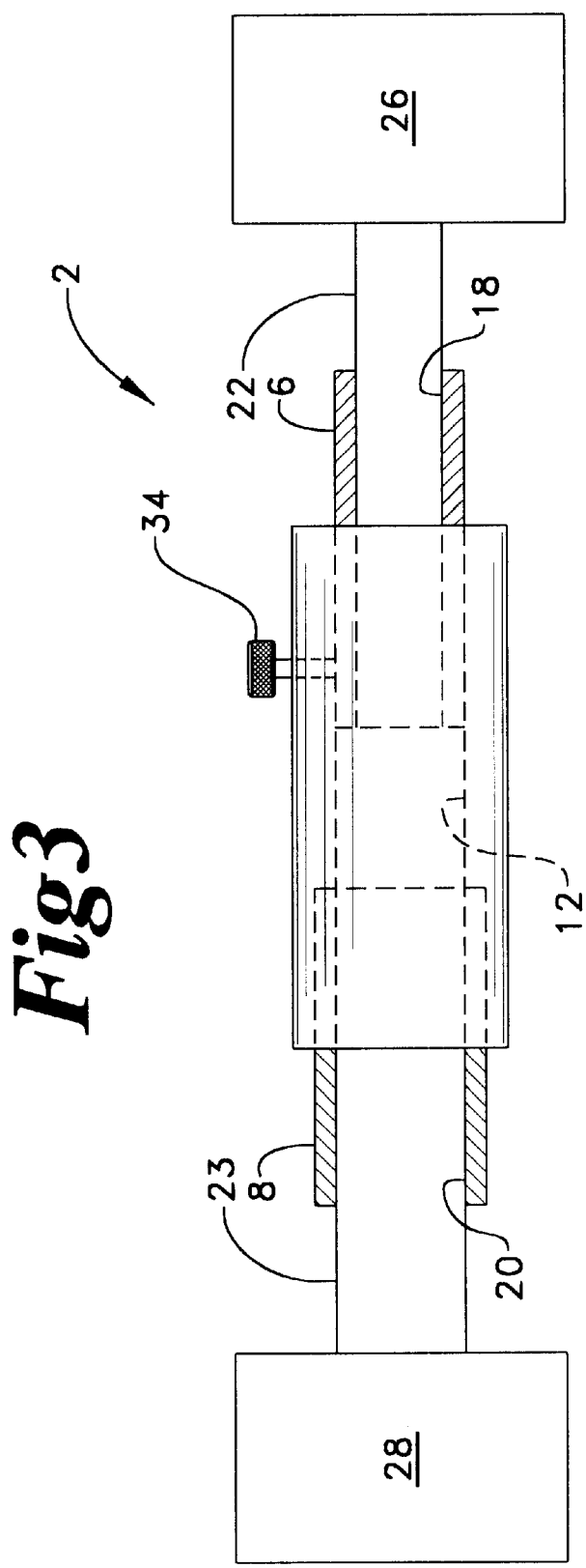
FIG. 3 is a diagrammatic side view of the apparatus of this invention with first and second aligning shafts positioned within the holder.

Referring to FIGS. 1–3, the apparatus 2 of this invention includes a holder 4, a first aligning shaft 6 (FIG. 3) and first and second aligning shafts 6,8 (FIG. 3) and means 10 for releaseably maintaining the first aligning shaft 6 at a preselected location within and relative to the holder 4.

The holder 4 has an axis and a longitudinally extending opening 12 extending at least a portion of the way therethrough along the axis of said holder 4. An axis of the opening or hole 12 is substantially coaxial with the axis of the holder 4 and has a preselected diameter.

Referring to FIG. 3, the first and second aligning shafts 6,8 each have an axis, a preselected outside diameter, and a substantially coaxial opening 18,20 extending at least a portion of the way along its respective axis and opening onto its respective end thereof. Each of the aligning shafts 6,8 are substantially coaxially slidably positionable within the holder opening 12. Each of the outside diameters 14,16 of the respective aligning shafts 6,8 is smaller and is substantially the same dimensions as the preselected diameter of the holding opening 12, thereby assuring substantially coaxial positioning the aligning shafts 6,8 with the holder 4.

Referring to FIG. 3, the coaxial openings 18,20 of the respective aligning shafts 6,8 are each of a size sufficient for receiving a portion of their respective rotatable shafts 22,23 of respective elements 26,28 These openings 18,20 are of substantially the same size and larger than their respective associated rotatable shaft 22,23 of elements 26,28 to be aligned, for example a motor 26 with a pump 28.

Figure 4:
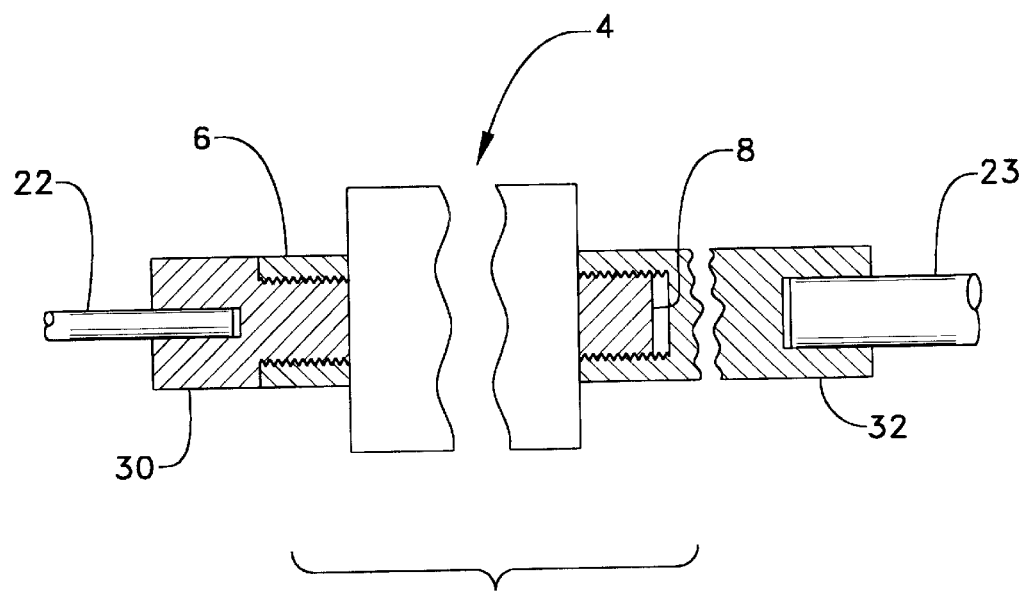
FIG. 4 is a diagrammatic side view of the apparatus of this invention showing various connections of the adapters to their respective aligning shafts.
Figure 5:
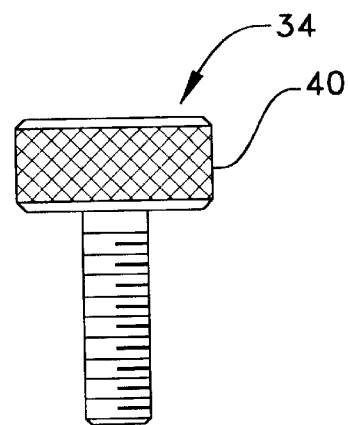
FIG. 5 is a diagrammatic side view of an element for connecting one of the aligning shafts to the holder.

In another embodiment of the association between the element shafts 22,23 with their respective aligning shaft 6,8, as shown in FIG. 4, one or more adapters 30,32 can be provided and releasable connected to an associated aligning shaft 6,8. As will be evident to one skilled in the art, such adapters provide a convenient way to provide for alignment of elements shafts 22,23 which are of different sizes relative one to the other. Kits can thereby be formed which contain various adapters to fit various sized element shafts 22,23 while utilizing a single holder, and associated first and second aligning shafts 6,8.

It should be understood that the adapters 30,32 can have internal threads thereon for mating with external treads of its associated aligning element, for example aligning shaft 8 associated with adapter 32 has external threads thereon for mating with internal treads of its adapter 32 and aligning shaft 6 has internal threads for mating with its respective adapter 30. In the preferred embodiment wherein an adapter is utilized, it is preferred that the aligning shafts 6,8 have external threads.

For simplicity, FIG. 4 shows internal threads on aligning element 6 and external threads on aligning element 8. It is to be understood that the aligning shafts 6 and 8 of an apparatus 2 can have like threads, either internal or external. Where the aligning shafts have internal threads, as shown in relation to aligning shaft 6, it is preferred that the outside diameter of the of the adapter 30 portion adjacent the adapter threads is of substantially the same dimensions as their respective cooperating aligning shaft outside diameter.

Referring to FIGS. 2–5, means 34 is provided for maintaining the one of the aligning shafts 6,8, for example the first aligning shaft 6 at a preselected location relative to the holder 4, for purposes which will be later explained.

In the preferred embodiment of the fastening means shown in 2,3 and 5, a slot 36 extends through and axially along a wall of the holder 4 and a threaded opening extends into a wall of the first aligning shaft 6. A threaded fastening element 40, such as a bolt or set screw passes through the slot 36 and is mateable with the threads of the opening for securing the first aligning shaft 6 relative to the holder 4.

It should be understood that the apparatus of the subject invention can be used for aligning stationary or rotatable shafts. The shafts to be aligned can be of substantially the same diameter or of different diameters. The elements of the invention can be formed of steel or any other rigid material without departing from this invention.

It should also be understood that the openings of the elements of this invention are precision machined to very close tolerances relative to the shafts of elements that are expected to be inserted into the openings and to the associated elements of this invention themselves. It is preferred that the tolerances of machining of the elements of this invention be in the range of about +0.0015 inch to about +0.002 inch per inch of shaft diameter on inside dimensions and −0.001 into to about −0.0015 inch per inch of shaft diameter on outside dimensions.

One skilled in the art can easily determine the wall thickness that will be desirable for providing the rigidity necessary for the intended use of invention which is controlled by the diameter of the element shafts that are being aligned. It is preferred that the first aligning shaft 6 has a length of about two thirds (⅔) of the overall length of the respective holder 4. It is also preferred that the length of the slot 26 should be sufficient for fastening the first aligning shaft 6 to the respective holder 4 when at least one half (½), more preferably, two thirds (⅔) of the length of said shaft 6 is extended beyond its respective holder 4.

INDUSTRIAL APPLICABILITY

Referring to FIGS. 1–5, a method is provided for axially aligning first and second shafts of elements prior to maintaining said elements relative one to the other.

In the embodiment of FIGS. 1 and 2, the aligning shaft 6 is inserted within the holding element 4. The holding element 4 is then positioned between the first and second element shafts to be aligned. The holding element 4 is then slid onto one of the element shafts to be aligned. The other element shaft to be aligned is then positioned along the axis of the holding element 4. The aligning barrel 6 is thereafter slid onto this other element shaft In the embodiment of FIGS. 3 and 4, first and second aligning shafts 6,8 are inserted within a holder 4. The first and second aligning shafts 6,8 and holder 4 are then positioned between first and second shafts 22,24 of respective first and second elements 26,28 to be aligned. Thereafter the first aligning shaft 6 is slid onto the first rotatable shaft 22 and releaseably connected to the holder 4. Thereafter, the second shaft 24 is aligned with the second aligning shaft opening 18 and then the second aligning shaft 8 is slid into the second element shaft 24.

After alignment of the shafts of their associated elements, for example a pump and motor, the pump and motor can be fixed relative to one another and the apparatus of this invention 2 removed. Thereafter a flexible coupling, or other device, can connect the aligned shafts one to the other for operation.

Other aspects, objects, and advantages of this invention can be obtained from a study of the drawings, the disclosure, and the appended claims.

What is claimed is:

1. An apparatus for substantially coaxially aligning first and second element shafts, comprising:

a holding element having an axis and an opening extending therethrough, said opening having first and second portions, said opening first portion being larger and substantially the same diameter as one of the element shafts;

an aligning shaft having an axis, an opening extending therethrough, and a preselected outside diameter, said aligning shaft being slidably, coaxially positionable within the second portion of the holding element opening, said aligning shaft outside diameter being smaller and substantially the same diameter as the diameter of the second end portion of the holding element opening, said aligning shaft opening having a diameter larger and substantially the same diameter as the diameter of the other of said element shafts; and means for releasably maintaining the aligning shaft at a plurality of preselected locations within and relative to the holding element.

2. An apparatus, as set forth in claim 1, wherein the diameters of the first and second portion of the holding element openings are of different dimensions.

3. An apparatus, as set forth in claim 1, wherein the maintaining means includes:

a slot extending through and axially along a wall of the holding element;

a threaded opening extending into a wall of the aligning shaft; and a threaded fastening element passing through the slot and being mateable with the threads of the aligning shaft threaded opening.

4. The alignment tool of claim 1 wherein said tubular holder comprises a first sidewall having an elongated slot therein and wherein said tubular alignment element comprises a second sidewall having a threaded aperture therein, the alignment tool further comprising a screw movably received through said elongated slot and threadedly received in said threaded aperture such that said alignment element may be telescopingly extended by moving said screw in a first direction and said alignment element may be telescopingly retracted by moving said screw in a second direction opposite said first direction.

5. An apparatus for substantially coaxially aligning adjacent first and second element shafts, comprising:

a holder having an axis and an opening, said opening having a preselected diameter extending therethrough;

a first aligning shaft having an axis, a preselected outside diameter, a coaxial opening, and being slidably positionable within the holder opening, said first aligning shaft outside diameter being smaller and substantially the same dimension as the preselected diameter of the holder opening and said first aligning shaft opening being of a size sufficient for receiving a portion of the first element shaft;

a second aligning shaft having an axis, a preselected outside diameter, a coaxial opening, and being slidably positionable within the holder opening, said second aligning shaft outside diameter being smaller and substantially the same dimensions as the preselected diameter of the holder opening and said second aligning shaft opening being of a size sufficient for receiving a portion of the second element shaft; and means for releasably maintaining the first aligning shaft at a preselected location within and relative to the holder.

6. An apparatus, as set forth in claim 5, wherein the maintaining means includes:

a slot extending through and axially along a wall of the holder;

a threaded opening extending into a wall of the first aligning shaft; and a threaded fastening element passing through the slot and being mateable with the threads of the first aligning shaft threaded opening.

7. An apparatus, as set forth in claim 5, at least one of the first and second aligning shafts has threads formed on a portion of an outer end portion thereof and including:

an adapter having threads mateable with the threads of said outer portion.

8. An apparatus, as set forth in claim 7, wherein both the first and second aligning shaft have threads formed on a portion of their respective outer end portion and including:

a second adapter having threads mateable with the threads of said other aligning shaft outer end portion.

9. An apparatus, as set forth in claim 8, wherein the outside diameters of the first and second adapters are each of substantially the same dimensions as their respective cooperating aligning shaft.

10. An apparatus, as set forth in claim 8 wherein the threads of each of the first and second aligning shaft end portions are internal threads.

11. An apparatus, as set forth in claim 7, wherein the outside diameter of the adapter is of substantially the same dimension as the diameter of the respective cooperating aligning shaft.

12. A method for axially aligning first and second shafts of elements prior to maintaining said elements relative one to the other, comprising:

inserting an aligning shaft within a holder;

positioning the aligning shaft and holder between first and second element shafts of respective first and second elements to be aligned;

sliding the holder onto the first element shaft;

aligning the second element shaft with the holder; and sliding the aligning shaft onto the second element shaft.

13. A method for axially aligning first and second shafts of elements prior to maintaining said elements relative one to the other, comprising:

inserting first and second aligning shafts within a holder;

positioning said first and second aligning shafts and holder between first and second element shafts of respective first and second elements to be aligned;

sliding said first aligning shaft onto the first element shaft;

releasably connecting said first aligning shaft to the holder; aligning the second element shaft with the second aligning shaft opening; and sliding said second aligning shaft onto the second element shaft.

14. An alignment tool for axially aligning a first element shaft having a first outside diameter and a second element shaft having a second outside diameter to a common longitudinal axis comprising:

a tubular holder having a first inside diameter substantially equal to the first outside diameter such that a first end of said tubular holder is receivable over said first element shaft;

a tubular aligning element having a third outside diameter substantially equal to said first inside diameter and a second inside diameter substantially equal to the second outside diameter such that said tubular aligning element is receivable over said second element shaft, said aligning element being telescopic with a second end of said tubular holder, wherein when said tubular holder is received over the first element shaft and said tubular aligning element is received in said tubular holder and over the second element shaft, the first and second element shafts are held in a position such that the first and second element shafts have a common longitudinal axis.

15. An alignment tool for axially aligning a first element shaft having a first outside diameter and a second element shaft having a second outside diameter to a common longitudinal axis comprising:

a tubular holder having a first inside diameter;

a first aligning element comprising a first tubular sidewall having a third outside diameter substantially equal to said first inside diameter and a second inside diameter substantially equal to the first outside diameter such that first aligning element is receivable over said first element shaft, said first aligning element being telescopic with a first end of said tubular holder; and a second aligning element comprising a second tubular sidewall having a fourth outside diameter substantially equal to said first inside diameter and a third inside diameter substantially equal to the second outside diameter such that second aligning element is receivable over said second element shaft, said second aligning element being telescopic with a second end of said tubular holder, wherein when said first aligning element is received over the first element shaft and said second aligning element is received over the second element shaft, the first and second element shafts are held in a position such that the first and second element shafts have a common longitudinal axis.

* * * * *